(12) United States Patent
Rong et al.

(10) Patent No.: US 11,443,909 B2
(45) Date of Patent: Sep. 13, 2022

(54) LIQUID ARC EXTINGUISH CHAMBER FOR DIRECT CURRENT BREAKING, DIRECT CURRENT BREAKER AND METHOD THEREOF

(71) Applicant: XI'AN JIAOTONG UNIVERSITY, Xi'an (CN)

(72) Inventors: Mingzhe Rong, Xi'an (CN); Yifei Wu, Xi'an (CN); Fei Yang, Xi'an (CN); Yi Wu, Xi'an (CN); Chunping Niu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/712,722

(22) Filed: Dec. 12, 2019

(65) Prior Publication Data
US 2020/0343063 A1 Oct. 29, 2020

(30) Foreign Application Priority Data

Apr. 23, 2019 (CN) .......................... 201910322260.3

(51) Int. Cl.
*H01H 33/68* (2006.01)
*H02H 9/04* (2006.01)
(Continued)

(52) U.S. Cl.
CPC .............. *H01H 33/68* (2013.01); *H02H 9/04* (2013.01); *H01H 33/22* (2013.01); *H01H 33/42* (2013.01)

(58) Field of Classification Search
CPC ........ H01H 33/68; H01H 33/22; H01H 33/42; H02H 9/04
(Continued)

(56) References Cited

U.S. PATENT DOCUMENTS 2,405,606 A * 8/1946 Rawlins ................. H01H 75/04
335/33
4,204,101 A * 5/1980 Dethlefsen ............. H01H 33/59
218/43
(Continued)

FOREIGN PATENT DOCUMENTS

CN         101197221 A  *  6/2008
CN         107068484 A  *  8/2017  ............. H01H 33/22
(Continued)

OTHER PUBLICATIONS

Yifei Wu, Mingzhe Rong, Yi Wu, Fei Yang, Mei Li, Jianying Zhong, Guohui Han, Chunping Niu, and Yang Hu, "Investigation of DC hybrid circuit breaker based on high-speed switch and arc generator", Review of Scientific Instruments 86, 024704 (2015) (Year: 2015).*

*Primary Examiner* — Thienvu V Tran
*Assistant Examiner* — Sreeya Sreevatsa
(74) *Attorney, Agent, or Firm* — Dragon Sun Law Firm, P.C.; Jinggao Li, Esq.; Nathaniel Perkins

(57) ABSTRACT

The present disclosure discloses a liquid arc extinguish chamber for direct current breaking. The liquid arc extinguish chamber for direct current breaking includes a cavity, a fixed contact and a moving contact. A liquid medium is sealed in the cavity. The fixed contact is hermetically fixed in the cavity. One end of the fixed contact is fixed in the cavity, and the other end of the fixed contact is connected with an outlet terminal A1. The moving contact is movably sealed in the cavity. One end of the moving contact may adjacently abut against or be in contact with the fixed contact, and the other end of the moving contact is connected with an outlet terminal A2.

8 Claims, 11 Drawing Sheets

(51) Int. Cl.
*H01H 33/22* (2006.01)
*H01H 33/42* (2006.01)

(58) Field of Classification Search
USPC .......................................................... 361/13
See application file for complete search history.

(56) References Cited

U.S. PATENT DOCUMENTS

| | | | | |
|---|---|---|---|---|
| 4,390,762 A * | 6/1983 | Watzke | .............. | H01H 33/6642 |
| | | | | 200/275 |
| 4,434,332 A * | 2/1984 | Yanabu | ................ | H01H 33/143 |
| | | | | 218/144 |
| 9,177,742 B2 * | 11/2015 | Ache | .................... | H01H 1/5822 |
| 2013/0033796 A1 * | 2/2013 | Shea | .................... | H01H 39/004 |
| | | | | 361/126 |
| 2015/0041437 A1 * | 2/2015 | Chapelle | .......... | H01H 33/66207 |
| | | | | 218/139 |
| 2016/0322809 A1 * | 11/2016 | Wang | ..................... | H02H 7/222 |

FOREIGN PATENT DOCUMENTS

| | | | | | |
|---|---|---|---|---|---|
| SU | | 1115121 A1 * | 10/1982 | | |
| SU | | 1115121 A1 * | 9/1984 | | |
| SU | | 1115121 A1 * | 9/1984 | | |
| WO | WO-2015097143 A1 * | | 7/2015 | ............. | H01H 33/22 |

\* cited by examiner

LIQUID ARC EXTINGUISH CHAMBER FOR DIRECT CURRENT BREAKING, DIRECT CURRENT BREAKER AND METHOD THEREOF

CROSS-REFERENCE TO RELATED APPLICATIONS

This application claims priority to and the benefit of CN 2019103222603, filed Apr. 23, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure relates to the technical field of electrical equipment, and more particularly relates to a liquid arc extinguish chamber for direct current breaking, a direct current breaker and a method thereof.

BACKGROUND

A direct current distribution network is an important development direction of future power grids. It has the advantages of flexible operation mode, high power quality, stable system and easiness of absorbing distributed new energy. A direct current breaker is one of core equipment to guarantee the safe and reliable operation of the direct current distribution network. Existing direct current breaking solutions mainly include a mechanical direct current breaking solution and a hybrid type direct current breaking solution, and a fracture thereof is mainly a vacuum fracture or an SF6 fracture. Since an arc voltage of the above fracture in a breaking process is low, it is difficult for the fracture to realize current breaking of medium- and high-voltage direct current systems by using its own arc voltage, and fracture current zeroing must be realized by current transfer. Meanwhile, due to the low arc voltage of the fracture, the fracture may not use its own arc voltage to realize rapid current transfer in the breaking process, and an auxiliary power electronic device or a pre-charging capacitor must be used to realize the transfer and breaking, which leads to a complicated breaking process, extremely high cost and low breaking capacity and reliability.

The above information is merely used to enhance the understanding to the background of the present disclosure, so that the information may possibly not contain information that does not constitute the prior art known to those of ordinary skill in the art.

Therefore, a heretofore unaddressed need exists in the art to address the aforementioned deficiencies and inadequacies.

SUMMARY

In view of the shortcomings or deficiencies in the prior art described above, the present disclosure aims to provide a liquid arc extinguish chamber for direct current breaking, a direct current breaker, and a method thereof. An arc voltage is substantially increased by arcing in liquid in a sealed cavity to quickly transfer current so as to complete rapid limitation and breaking of a direct current.

Specifically, the present disclosure adopts the following technical solution:

a liquid arc extinguish chamber for direct current breaking, including:

a cavity, in which a liquid medium is sealed;

a fixed contact, hermetically fixed in the cavity, wherein one end of the fixed contact is fixed in the cavity, and the other end of the fixed contact is connected with an outlet terminal A1; and a moving contact, movably sealed in the cavity, wherein one end of the moving contact may adjacently abut against or be in contact with the fixed contact, and the other end of the moving contact is connected with an outlet terminal A2. When the moving and fixed contacts are closed, current flows through the moving contact and the fixed contact. When the moving contact is pulled open for breaking, an arc generated between the moving contact and the fixed contact vaporizes the liquid medium to form a liquid jet. The liquid jet pushes the arc to move so as to raise an arc voltage.

In the liquid arc extinguish chamber for direct current breaking, the fixed contact is sealed in the cavity in a bellows seal manner, and/or the moving contact is sealed in the cavity in a bellows, slidable or rotatable seal manner.

In the liquid arc extinguish chamber for direct current breaking, the moving contact is connected with a pull rod, and the other end of the pull rod is connected with a driving device.

In the liquid arc extinguish chamber for direct current breaking, the pull rod is a metal pull rod or an insulating pull rod, and the pull rod is in threaded connection or pin connection with the moving contact.

In the liquid arc extinguish chamber for direct current breaking, the other end of the driving device is connected with a retaining device. The driving device is any one of an electromagnetic repulsion-based driving device, a permanent magnetic mechanism, and an electromagnet or a combination thereof. The retaining device is a bistable spring retaining device or an electromagnet or permanent magnet retaining device.

In the liquid arc extinguish chamber for direct current breaking, a shell of the cavity is a ceramic shell or a metal shell. The fixed contact and/or the moving contact are contacts with arc striking angles, flat contacts and contacts with transverse-magnetic or longitudinal-magnetic slots. The fixed contact is made of pure copper, a copper-tungsten alloy or a copper-chromium alloy.

In the liquid arc extinguish chamber for direct current breaking, the liquid medium is water, plant oil or transformer oil. The cavity is fully filled with the liquid medium, or a gas gap is reserved.

On another aspect of the present disclosure, a direct current breaker includes:

a liquid arc extinguish chamber for direct current breaking; and an energy dissipation device, connected in parallel with the liquid arc extinguish chamber, wherein one end of the energy dissipation device is connected with an outlet terminal A1, and the other end of the energy dissipation device is connected with an outlet terminal A2.

In the direct current breaker, the energy dissipation device includes an overvoltage limiting module. The overvoltage limiting module includes but is not limited to any one or any combination of a metal oxide arrester, a line type metal oxide arrester, a gapless line type metal oxide arrester, a fully-insulated compound outer sleeve metal oxide arrester, and a detachable arrester.

According to another aspect of the present disclosure, a breaking method using the direct current breaker includes the following steps:

Step I, closing moving and fixed contacts to allow current to flow through the moving contact and the fixed contact;

Step II, pulling open the moving contact for breaking, vaporizing, by an arc generated between the moving contact and the fixed contact, a liquid medium to form a liquid jet, wherein the liquid jet pushes the arc to move to raise an arc voltage; and Step III, triggering, by the arc voltage, an energy dissipation device to be conducted to allow the current to be quickly transferred and be cut off by the energy dissipation device, thereby completing current breaking.

Beneficial Effects

The present disclosure uses a liquid arc to substantially increase a fracture voltage, which simplifies a breaking solution, substantially reduces or eliminates the use of power electronic devices, improves the economy and breaking reliability of the direct current breaker and may meet requirements of a current direct current distribution network for safety, reliability and economy.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

The foregoing and other objectives, features and advantages of the present disclosure will be better understood below through illustrative and nonrestrictive detailed descriptions of the embodiments of the present disclosure with reference to the accompanying drawings.

Figure 1:
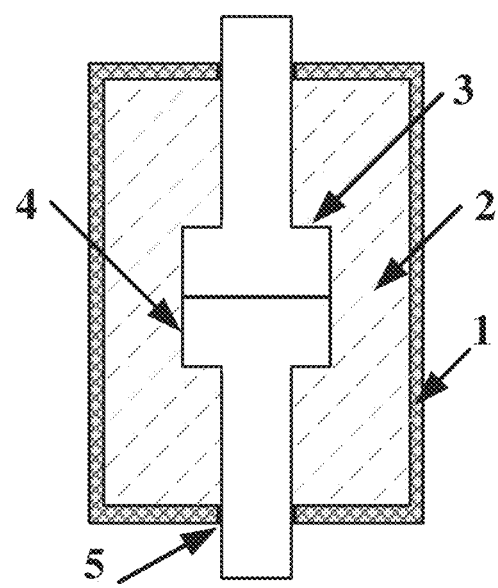
FIG. 1 is a structural example 1 of a liquid arc extinguish chamber.

All the drawings are schematic, and do not have to be completely consistent. The present disclosure is further explained below in combination with the drawings and the embodiments.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The detailed descriptions below are actually merely exemplary and are not intended to limit applications and uses. Furthermore, the present disclosure is not restricted by the above technical field, background, summary or any explicit or implied theories shown in the detailed descriptions below. Unless otherwise explicitly stated to the contrary, the word "include" and different variations thereof shall be comprehended as impliedly including the components, but not excluding other components.

The specific implementations of the present disclosure are described below in combination with FIGS. 1 to 9.

FIG. 1 is a structural schematic diagram of a breaker body. A liquid arc extinguish chamber for direct current breaking includes:

a cavity, in which a liquid medium is sealed;

a fixed contact, hermetically fixed in the cavity, wherein one end of the fixed contact is fixed in the cavity, and the other end of the fixed contact is connected with an outlet terminal A1; and a moving contact, movably sealed in the cavity, wherein one end of the moving contact may adjacently abut against or be in contact with the fixed contact, and the other end of the moving contact is connected with an outlet terminal A2. When the moving and fixed contacts are closed, current flows through the moving contact and the fixed contact. When the moving contact is pulled open for breaking, an arc generated between the moving contact and the fixed contact vaporizes the liquid medium to form a liquid jet. The liquid jet pushes the arc to move so as to raise an arc voltage.

In one embodiment of the liquid arc extinguish chamber for direct current breaking, the fixed contact is sealed in the cavity in a bellows seal manner, and/or the moving contact is sealed in the cavity in a bellows, slidable or rotatable seal manner.

In another embodiment of the liquid arc extinguish chamber for direct current breaking, the moving contact is connected with a pull rod, and the other end of the pull rod is connected with a driving device.

In another embodiment of the liquid arc extinguish chamber for direct current breaking, the pull rod is a metal pull rod or an insulating pull rod, and the pull rod is in threaded connection or pin connection with the moving contact.

In another embodiment of the liquid arc extinguish chamber for direct current breaking, the other end of the driving device is connected with a retaining device. The driving device is any one of an electromagnetic repulsion-based driving device, a permanent magnetic mechanism, and an electromagnet or a combination thereof. The retaining device is a bistable spring retaining device or an electromagnet or permanent magnet retaining device.

In another embodiment of the liquid arc extinguish chamber for direct current breaking, a shell of the cavity is a ceramic shell or a metal shell. The fixed contact and/or the moving contact are contacts with arc striking angles, flat contacts and contacts with transverse-magnetic or longitudinal-magnetic slots. The fixed contact is made of pure copper, a copper-tungsten alloy or a copper-chromium alloy.

In another embodiment of the liquid arc extinguish chamber for direct current breaking, the liquid medium is water, plant oil or transformer oil. The cavity is fully filled with the liquid medium, or a gas gap is reserved.

In the present disclosure, during normal flowing, the moving and fixed contacts are closed, and current flows through the moving and fixed contacts. During breaking, the moving contact is pulled open, and the moving and fixed contacts directly generate an arc, so that the temperature between the contacts is raised rapidly, and then the liquid medium between the contacts is vaporized; the gas pressure between the contacts is increased rapidly, and a rapid liquid jet is formed to push the arc to move, which causes a sharp rise of the arc voltage; and the arc voltage triggers an energy dissipation branch to be conducted, so that the current is quickly transferred and then is cut off by the energy dissipation branch to complete current breaking.

In order to further understand the present disclosure, in one embodiment, FIG. 1 is a structural example 1 of a liquid arc extinguish chamber: 1 for an arc extinguish chamber body shell, 2 for a liquid medium, 3 for a fixed contact, 31 for an inner portion of the fixed contact, 32 for an outer portion of the fixed contact, 4 for a moving contact, 5 for a sealed joint, 7 for a pivot, 8 for a driving device, and 9 for a retaining device. The contacts may be contacts with arc striking angles, flat contacts and contacts with transverse-magnetic or longitudinal-magnetic slots.

Figure 2:
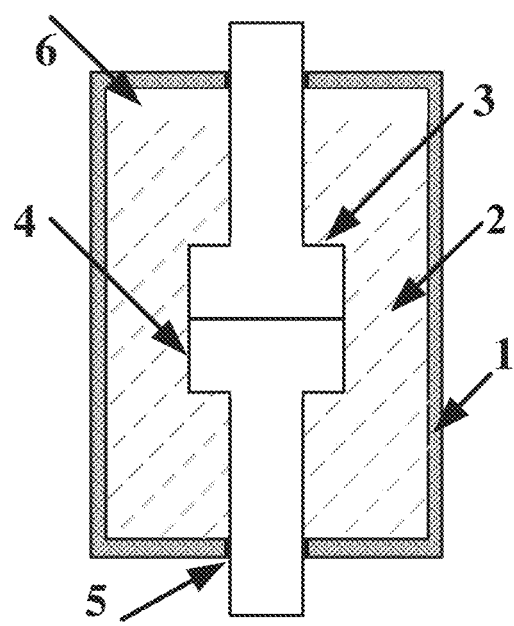
FIG. 2 is a structural example 2 of a liquid arc extinguish chamber.

In one embodiment, FIG. 2 is a structural example 2 of a liquid arc extinguish chamber: 1 for an arc extinguish chamber body shell, 2 for a liquid medium, 3 for a fixed contact, 4 for a moving contact, 5 for a sealed joint, and 6 for an air gap. The contacts may be contacts with arc striking angles, flat contacts and contacts with transverse-magnetic or longitudinal-magnetic slots.

Figure 3:
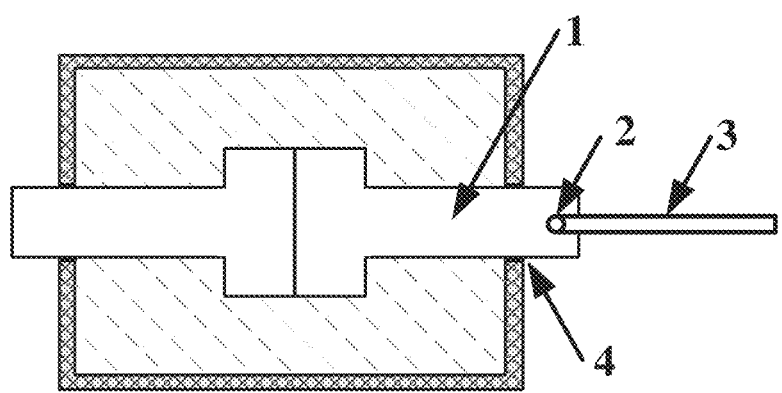
FIG. 3 is a sealing mode 1 of a liquid arc extinguish chamber.
Figure 4:
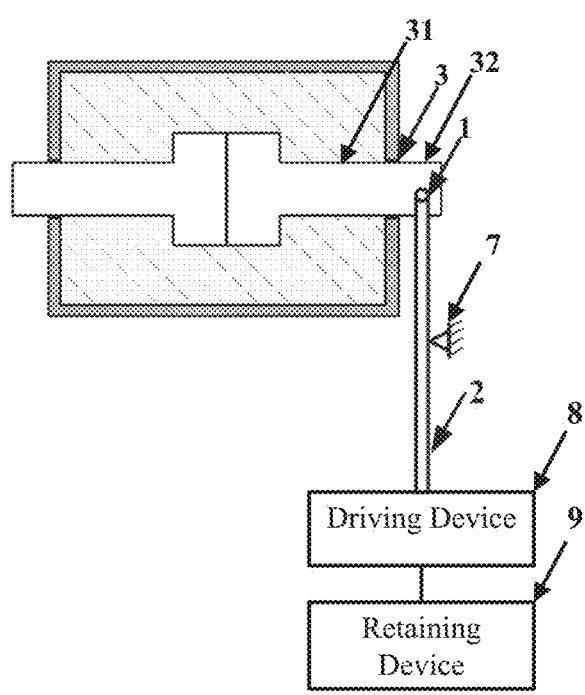
FIG. 4 is a sealing mode 2 of a liquid arc extinguish chamber.

In one embodiment, FIG. 3 is a schematic diagram of a slidable sealing mode of a liquid arc extinguish chamber: 1 for a moving contact; 2 for a pull rod and contact joint point, which may be in threaded connection or pin connection; 3 for a pull rod, which may be a metal pull rod or an insulating pull rod; and 4 for a sealed joint.

In one embodiment, FIG. 3 is a schematic diagram of a rotatable sealing mode of a liquid arc extinguish chamber: 1 for a moving contact; 2 for a pull rod and contact joint point, which may be in threaded connection or pin connection; 3 for a pull rod, which may be a metal pull rod or an insulating pull rod; and 4 for a sealed joint.

Figure 5:
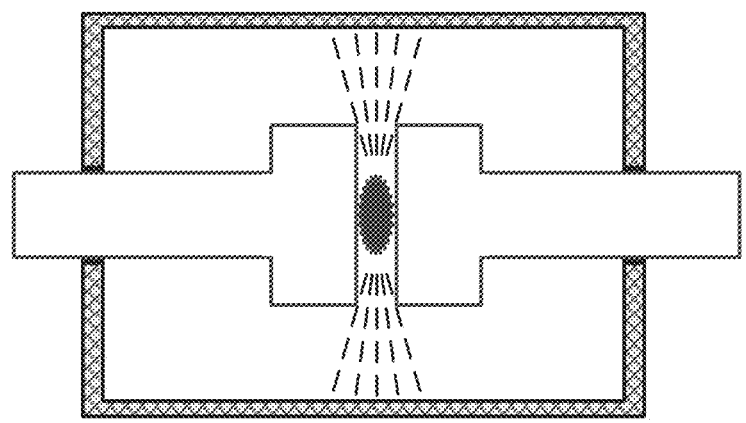
FIG. 5 is a schematic diagram of a working state of a liquid arc extinguish chamber.

In one embodiment, FIG. 5 is a schematic diagram of breaking of a liquid arc extinguish chamber. During breaking, a moving contact is pulled open, and moving and fixed contacts directly generate an arc, so that the temperature between the contacts is raised rapidly, and then a liquid medium between the contacts is vaporized; since the liquid may not be compressed, the gas pressure between the contacts is increased rapidly; and the liquid is jetted fast to push the arc to move.

Figure 6:
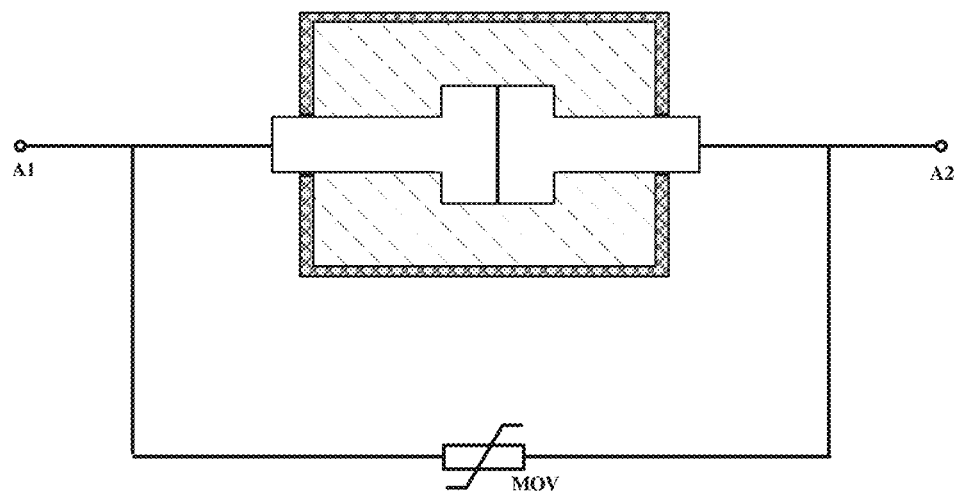
FIG. 6 is an example of the present disclosure.

As shown in FIG. 6, a direct current breaker includes:
a liquid arc extinguish chamber for direct current breaking; and
an energy dissipation device, connected in parallel with the liquid arc extinguish chamber, wherein one end of the energy dissipation device is connected with an outlet terminal A1, and the other end of the energy dissipation device is connected with an outlet terminal A2.

In one embodiment, the energy dissipation device includes an overvoltage limiting module. The overvoltage limiting module includes but is not limited to any one or any combination of a metal oxide arrester, a line type metal oxide arrester, a gapless line type metal oxide arrester, a fully-insulated compound outer sleeve metal oxide arrester, and a detachable arrester.

Figure 7A:
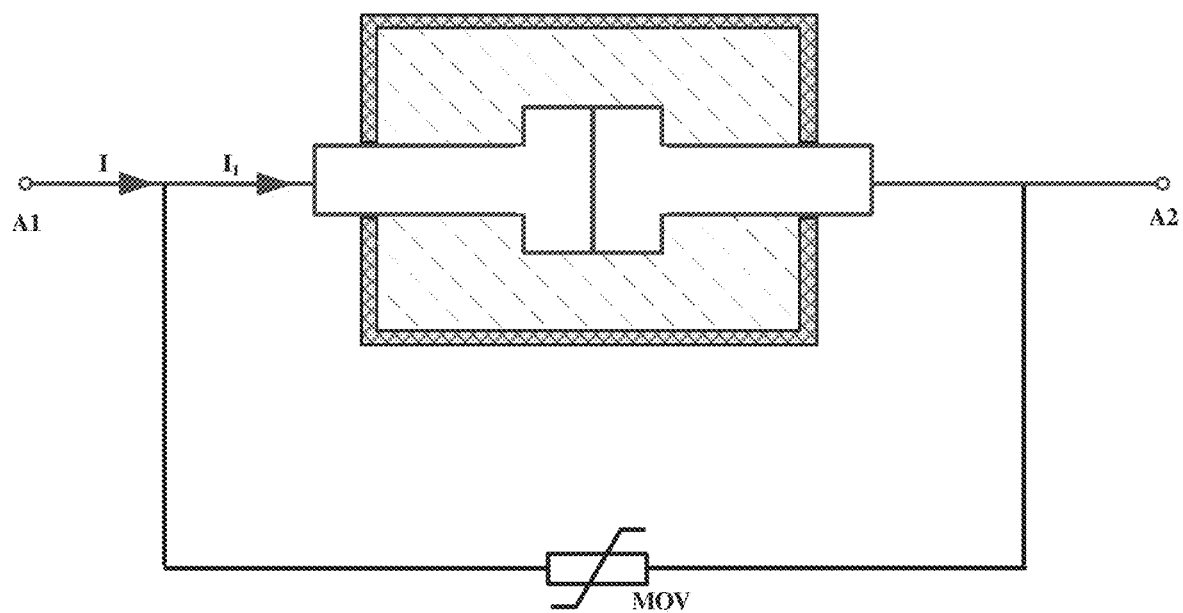
FIGS. 7(*a*) to 7(*c*) each is a specific working process of an example.
Figure 7B:
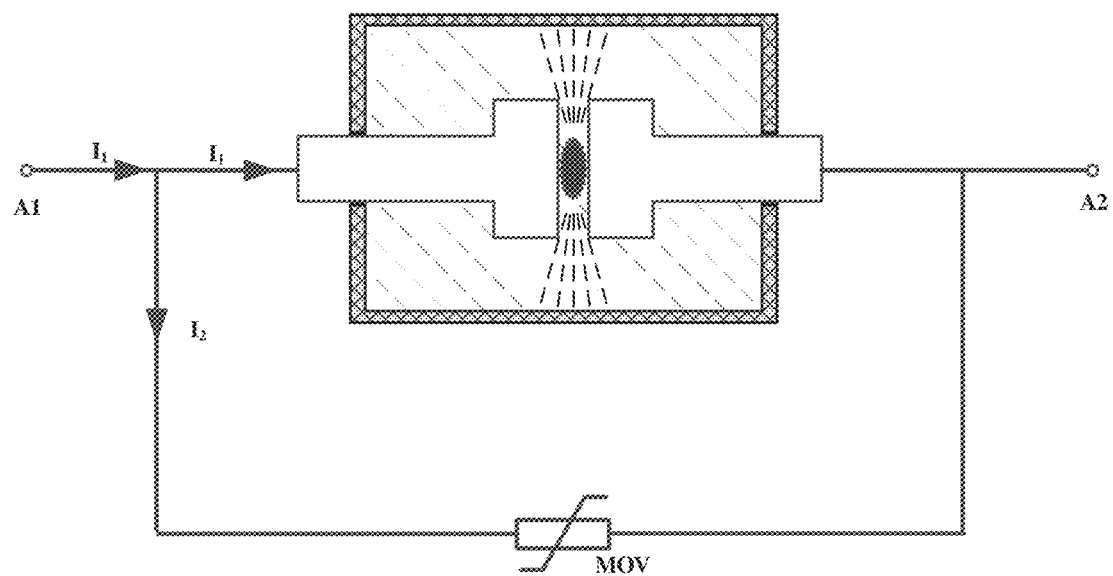
Figure 7C:
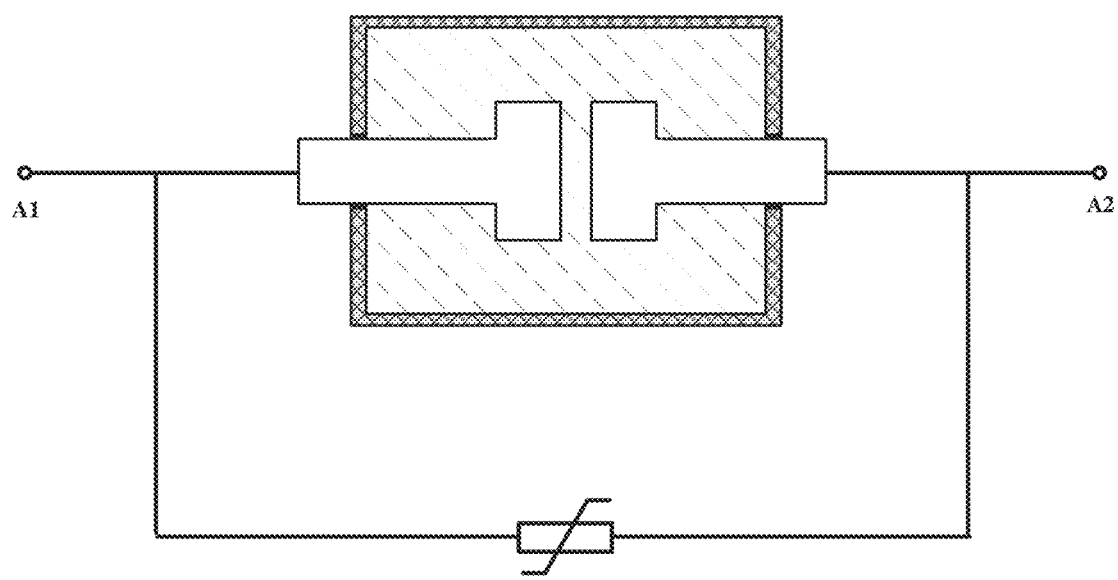

In one embodiment, FIG. 6 is an application example of a liquid arc extinguish chamber. FIGS. 7(a) to 7(c) show a specific working process:

(1) in a normal flowing state as shown in FIG. 7(a), system current flows in from an outlet terminal A1, then flows through moving and fixed contacts and flows out from an outlet terminal A2;

(2) as shown in FIG. 7(b), during current breaking, the moving contact is pulled open, and arcing is started between the moving and fixed contacts; a liquid medium is vaporized rapidly under the action of the arc to allow an arc voltage to be raised rapidly; and an MOV (Metal Oxide Varistor) is conducted till the arc voltage reaches a threshold voltage of the MOV; and (3) as shown in FIG. 7(c), the MOV completes short-circuit energy dissipation, and then the arc is extinguished, thereby completing the breaking.

Figure 8:
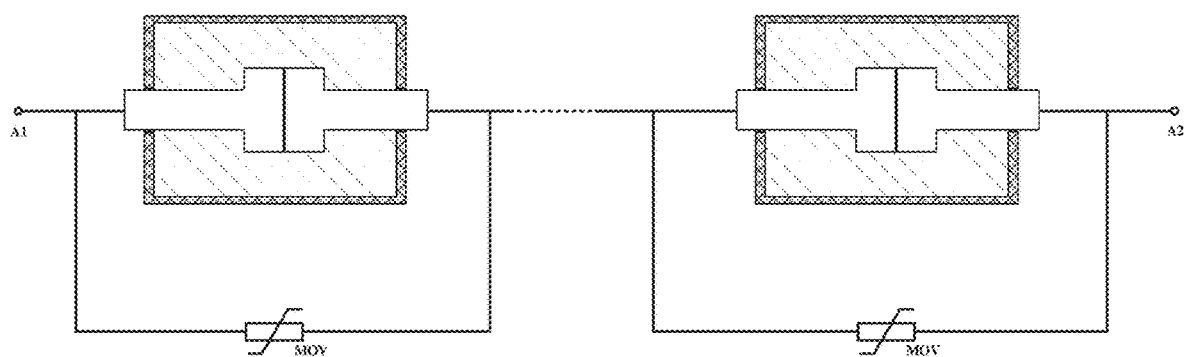
FIG. 8 is an example of the present disclosure.

In one embodiment, FIG. 8 is an application example of a liquid arc extinguish chamber. An arc extinguish chamber is connected in parallel with an arrester, and then a plurality of the parallel-connected arc extinguish chambers and arresters form a direct current breaker.

Figure 9:
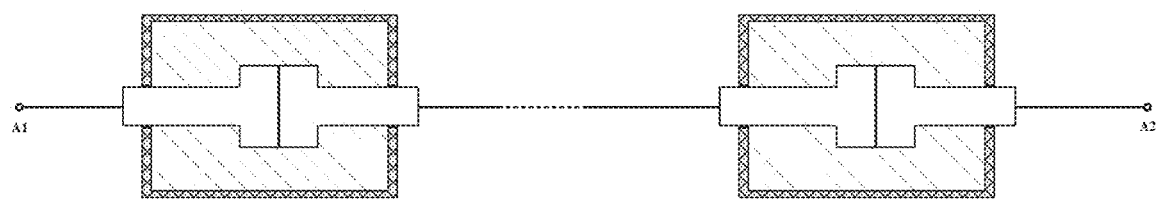
FIG. 9 is an example of the present disclosure.

In one embodiment, FIG. 9 is an application example of a liquid arc extinguish chamber. A plurality of arc extinguish chambers are connected in series to form a direct current breaker.

In the present disclosure, a breaking method using the direct current breaker includes the following steps:

Step I, moving and fixed contacts are closed to allow current to flow through the moving contact and the fixed contact;

Step II, the moving contact is pulled open for breaking, and an arc generated between the moving contact and the fixed contact vaporizes a liquid medium to form a liquid jet, wherein the liquid jet pushes the arc to move to raise an arc voltage; and Step III, the arc voltage triggers an energy dissipation device to be conducted to allow the current to be quickly transferred and be cut off by the energy dissipation device, thereby completing current breaking.

The above content is a further detailed description to the present disclosure in combination with the specific preferred implementations, and it cannot be understood that the specific implementations of the present disclosure are limited thereto. Those of ordinary skill in the art to which the present disclosure belongs also can make a plurality of simple deductions or replacements without departing from the concept of the present disclosure. For example, a one-way solid-state switch branch and a one-way oscillation branch-based one-way liquid arc extinguish chamber for direct current breaking is deducted. These deductions or replacements shall all be regarded as falling within the protection scope defined by submitted claims of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A direct current breaker, consisting of two branches in parallel:
   a first branch comprising:
   a liquid arc extinguish chamber for direct current breaking, comprising:
   a cavity, in which a liquid medium is sealed, wherein the liquid medium comprises plant oil or transformer oil and the cavity is fully filled with the liquid medium;
   a fixed contact made of pure copper, a copper-tungsten alloy or a copper-chromium alloy, hermetically fixed in the cavity and sealed in the cavity in a bellows seal manner, wherein one end of the fixed contact is fixed in the cavity, and the other end of the fixed contact is connected with an outlet terminal A1; and
   a moving contact, movably sealed in the cavity in a bellows, slidable seal manner, wherein one end of the moving contact adjacently abuts against or is in contact with the fixed contact, and the other end of the moving contact is connected with an outlet terminal A2; and
   a second branch consisting of an energy dissipation device, connected in parallel with the liquid arc extinguish chamber, wherein one end of the energy dissipation device is mechanically and electrically connected with an outlet terminal A1, and the other end of the energy dissipation device is mechanically and electrically connected with the outlet terminal A2,
   wherein when the moving and fixed contacts are closed, a current I1 flows through the moving contact and the fixed contact and no current flows through the second branch; when the moving contact is pulled open for breaking, an arc generated between the moving contact and the fixed contact vaporizes the liquid medium to form a liquid j et; and the liquid jet pushes the arc to move so as to raise an arc voltage, and the arc voltage triggers the energy dissipation device to be conducted to allow a current I2 to be quickly transferred and be cut off by the energy dissipation device and no current flows through the first branch, thereby completing current breaking;
   wherein when the moving contact is in contact with the fixed contact, the current I between the terminal A1 and the terminal A2 is equal to the current I1 of the fixed contact and the moving contact and no current flows through the second branch; and when the moving contact moves away from the fixed contact, the current I is equal to a current I2 of the energy dissipation device and no current flows through the first branch;
   wherein the moving contact comprises an outer portion and an inner portion, the inner portion is disposed within the cavity, the outer portion is disposed outside of the cavity, the outer portion is directly connected with one end of a pull rod through a fixed joint; the pull rod is configured to be rotatable along the fixed joint and to drive the moving contact to the fixed joint; the pull rod is substantially perpendicular to the moving contact; and when the pull rod rotates in a clockwise direction against a pivot, the moving contact moves away from the fixed contact horizontally and when the pull rod rotates in an anticlockwise direction against the pivot, the moving contact moves close to the fixed contact horizontally, wherein the pivot is adjacent to the pull rod; and
   the other end of the pull rod is connected with one end of a driving device; the other end of the driving device is connected with a retaining device; the driving device is an electromagnetic repulsion-based driving device; and the retaining device is a bistable spring retaining device.

2. The direct current breaker according to claim 1, wherein a shell of the cavity is a ceramic shell or a metal shell; the fixed contact and/or the moving contact comprise: contacts with arc striking angles, flat contacts and contacts with transverse-magnetic or longitudinal-magnetic slots; and the fixed contact is made of pure copper, a copper-tungsten alloy or a copper-chromium alloy.

3. The direct current breaker according to claim 1, wherein the energy dissipation device comprises an overvoltage limiting module; the overvoltage limiting module includes but is not limited to any one or any combination of a metal oxide arrester, a line type metal oxide arrester, a gapless line type metal oxide arrester, a fully-insulated compound outer sleeve metal oxide arrester, and a detachable arrester.

4. The direct current breaker according to claim 3, wherein the pull rod is a metal pull rod or an insulating pull rod, and the pull rod is in threaded connection or pin connection with the moving contact.

5. A breaking method using the direct current breaker according to claim 3, comprising the following steps:
   Step I, closing the moving contact and the fixed contact to allow current to flow through the moving contact and the fixed contact;
   Step II, pulling open the moving contact for breaking, vaporizing, by an arc generated between the moving contact and the fixed contact, a liquid medium to form a liquid jet, wherein the liquid jet pushes the arc to move to raise an arc voltage; and
   Step III, triggering, by the arc voltage, an energy dissipation device to be conducted to allow the current to be quickly transferred and be cut off by the energy dissipation device, thereby completing current breaking.

6. A breaking method using the direct current breaker according to claim 1, comprising the following steps:
   Step I, closing the moving contact and the fixed contact to allow current to flow through the moving contact and the fixed contact;
   Step II, pulling open the moving contact for breaking, vaporizing, by an arc generated between the moving contact and the fixed contact, a liquid medium to form a liquid jet, wherein the liquid jet pushes the arc to move to raise an arc voltage; and
   Step III, triggering, by the arc voltage, an energy dissipation device to be conducted to allow the current to be quickly transferred and be cut off by the energy dissipation device, thereby completing current breaking.

7. The direct current breaker according to claim 1, wherein the pull rod is a metal pull rod or an insulating pull rod, and the pull rod is in threaded connection or pin connection with the moving contact.

8. The direct current breaker according to claim 1, further comprising an additional liquid arc extinguish chamber connected in parallel with an additional energy dissipation device, wherein the two branches in parallel are connected in series with the additional liquid arc extinguish chamber connected in parallel with the additional energy dissipation device.

\* \* \* \* \*